United States Patent [19]

Adelman

[11] 4,263,360
[45] Apr. 21, 1981

[54] COATED PAPER-MICROFOAM SHEET PACKAGING MATERIAL

[75] Inventor: Herbert B. Adelman, Wilmington, Del.

[73] Assignee: The Crowell Corporation, Newport, Del.

[21] Appl. No.: 166,079

[22] Filed: Jul. 7, 1980

[51] Int. Cl.³ .............................................. B32B 7/02
[52] U.S. Cl. ................................... 428/238; 428/247; 428/251; 428/285; 428/286; 428/294; 428/305; 428/311; 428/315; 428/412; 428/513
[58] Field of Search ............... 428/109, 110, 238, 239, 428/247, 251, 285, 286, 293, 294, 295, 305, 311, 315, 412, 513

[56] References Cited

U.S. PATENT DOCUMENTS

| | | | |
|---|---|---|---|
| 4,054,711 | 10/1977 | Botsolas | 428/286 |
| 4,086,384 | 4/1978 | Adelman et al. | 428/251 |
| 4,181,767 | 1/1980 | Steinan | 428/513 |
| 4,204,016 | 5/1980 | Chavannes | 428/294 |

Primary Examiner—William J. Van Balen
Attorney, Agent, or Firm—Connolly and Hutz

[57] ABSTRACT

A padded sheet material for packaging a moisture-sensitive material has a layer of paper which is adhered on one side of a layer of a sealed cell microporous foam polymer, such as microfoam. It is coated on the other side with a layer of a polymer, which excludes the passage of drops of water, but transmits moisture vapor through it whereby any condensate within the package evaporates out through the material. The paper may be reinforced with strands of fiberglass to strengthen it.

11 Claims, 3 Drawing Figures

COATED PAPER-MICROFOAM SHEET PACKAGING MATERIAL

BACKGROUND OF THE INVENTION

U.S. Pat. No. 4,086,384 describes a highly useful paper-microfoam sheet packaging material in which a layer of a sealed cell microporous foam polymer, such as microfoam, is adhered to a layer of kraft paper, which may be reinforced by fiberglass strands. Such material forms highly effective packages, but does not sufficiently protect moisture-sensitive objects, such as tin plate, which are subject to corrosion under ordinary atmospheric conditions. An object of this invention is to provide a laminated sheet material for packaging a moisture-sensitive material and protecting it from being damaged by moisture over extended periods of storage. Another object is to provide such a laminated sheet material which is suitable for packaging sheets of tin-plated steel or other metals and preventing them from rusting or corroding over extended periods of storage.

SUMMARY OF THE INVENTION

A padded sheet material for packaging a moisture-sensitive material has a layer of paper which is adhered on one side to a layer of a sealed cell microporous foam polymer, such as microfoam. It is coated on the other side with a layer of polymer, which excludes the passage of drops of water, but transmits moisture vapor through it whereby any condensate within the package evaporates out through the material. The paper may be reinforced with stands of fiberglass or other suitable reinforcing fibers to strengthen it.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
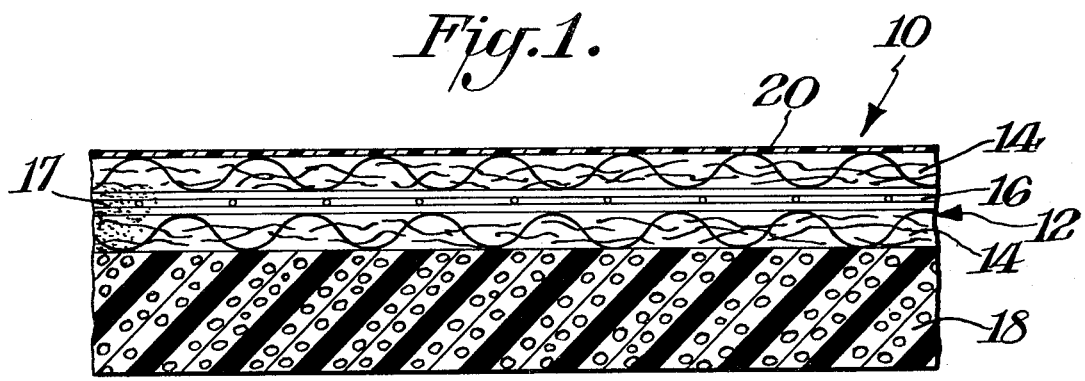
FIG. 1 is a cross-sectional view in elevation of a laminated sheet material which is one embodiment of this invention.

In FIG. 1 is shown a laminated sheet material 10 for packaging or wrapping moisture-sensitive material, such as tin-plated steel (not shown). Tin plate is a specialty grade of steel sold to canners. Because of the end use application, the tin plate must be completely free from corrosion. Because of this, the steel mill must exert extra care in the packaging of tin plate and will guarantee the product for thirty days. If corrosion occurs prior to the thirty day period, the steel companies will take back any shipment where corrosion has formed.

Sheet 10 includes a layer of paper material 12 which has two plies of kraft paper 14 reinforced by strands of fiberglass 16. Kraft paper plies 14 are each, for example, fifty pound kraft paper. Other useful types of kraft paper are, for example, thirty pound, sixty pound or ninety pound, or even forty-two pound liner board. Fiberglass strands 16 arranged, for example, in a diamond pattern, are interspersed between paper plies 14. Plies 14 are adhered to each other and to the interspersed fiberglass in a diamond pattern and longitudinal fiber arrangement and sealed overall by adhesive 17 which is, for example, of the hot melt type, such as amorphous polypropylene. The ultimately laminated sheet 10 has remarkable strength to weight ratio and is extremely useful for wrapping and packaging where substantial tear strength and protection against moisture are required, such as in packaging sheets of tin-plated steel. Reinforcement may also be accomplished by adhering other types of mesh to the laminate, such as polypropylene.

The bottom layer 18 is a sealed cell microporous polymer. It may be, for example, from about 1/16 inch to ¼ inch thick. A highly effective sealed cell microporous foam polymer is, for example, a 1/16 inch or 3/32 inch thick layer of microfoam, which is, for example, microfoam, available from E. I. DuPont de Nemours & Co. of Wilmington, Del. It is made from polypropylene resin, and constitutes a high-bulk material with approximately fifty thousand closed air cushioned cells per cubic inch. Foam polymer layer 18 is adhered to the paper by the same hot melt adhesive used in conjuction with the original two-ply kraft paper.

A layer 20 of a hydrophobic polymer, such as polyethylene, is disposed over top of two-ply kraft paper layer 12 to complete the laminated sheet. It is, for example, adhered to the kraft side by coating or extrusion. Polymer coating 20 may be colored to distinguish it and to control the passage of light through it. It also may be made of other suitable water vapor transmissive hydrophobic polymers, such as polypropylene, polycarbonate and the like.

Laminate 10 may be used for wrapping loads of tin plate and other metals preventing corrosion prior to use. Corrosion and rust prevention for over thirty days have been thus accomplished. The product has excellent versatility and performance for the special problems of tin plate packaging. In addition to its ability to protect the tin plate from external moisture damage, the construction permits the wrap to "breathe". This means that as condensate is formed because of temperature variation in shipment, such function permits evaporation of the condensate rather than its retention within the package which would cause corrosion. Laminate 10 has excellent properties helped by the contact of the microporous foam with the tin plate (not shown). Such microporous foam material made of polypropylene complies with F.D.A. regulations, which permit it to be safely used as an article or a component of an article intended for use in contact with food. It is unaffected by exposure to grease, water and most acids, bases and solvents. It stays flexible within a wide temperature range, has a neutral pH, is non-toxic, non-corrosive, lint-free, has excellent abrasion resistance and will not support the growth of mildew or fungus. It has an excellent, clean-white appearance which is highly desirable for the packaging of tin plate.

Figure 2:
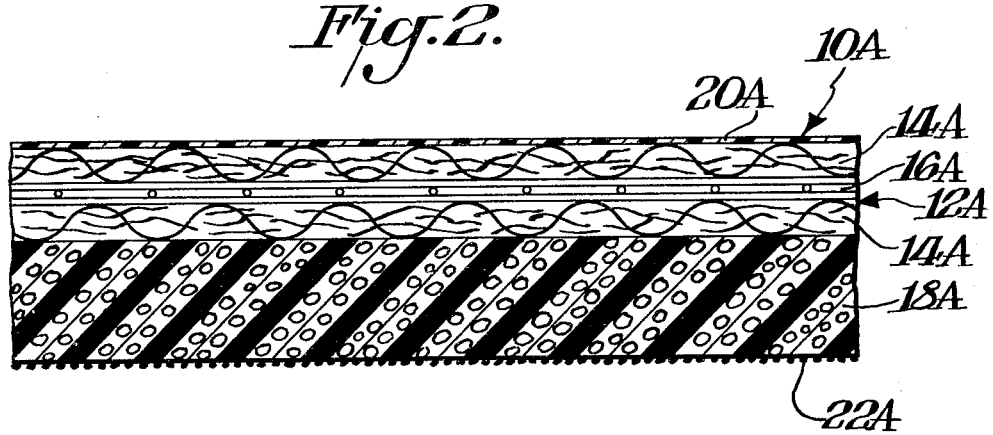
FIG. 2 is another cross-sectional view in elevation of another laminated sheet material which is another embodiment of this invention.

FIG. 2 shows another laminate 10A of this invention in which a layer 22A of cohesive material is applied to the outer surface of microporous foam layer 18A. Cohesive layer 22A is, for example, a latex material having a property of sticking to itself but not adhering to other materials. This cohesiveness facilitates securing sheet 10A about an object wrapped within it. Although it is nonadherent to objects other than itself, it does have extremely high frictional resistance and is somewhat rubbery to the touch. It, therefore, does not slide off an object and makes it easy to wrap and advantageously stays in place to further facilitate the enfolding and sealing process. Laminated sheet 10A is otherwise the same as sheet 10.

Figure 3:
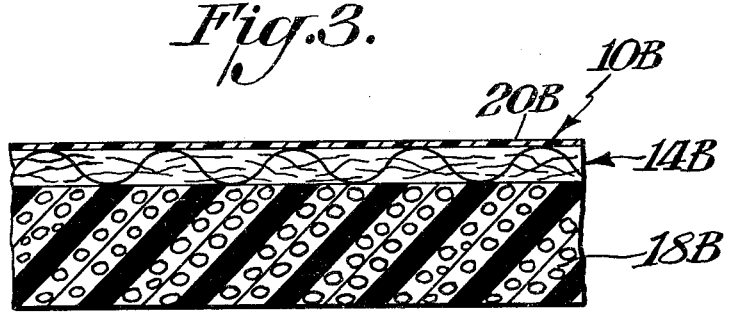
FIG. 3 is a further cross-sectional view in elevation of a further laminated sheet material which is a further embodiment of this invention.

FIG. 3 shows a further laminated sheet 10B which is the same as sheet 10 in FIG. 1, except that a single ply 14B of kraft paper of, for example, sixty pound weight is utilized instead of reinforced two-ply kraft paper layer 12 of FIG. 1. Sheet 10B can be used when the extremely great tear strength of sheet 10 is not required. Microporous foam layer 18B could have cohesive layer applied as shown in FIG. 2.

I claim:

1. A laminated sheet material for packaging a moisture-sensitive material comprising a layer of paper material, a layer of a sealed cell microporous foam polymer, a strong adhesive material securely binding the microporous foam polymer and paper layers together, and a layer of a polymer which excludes the passage of drops of water but transmits moisture vapor through it on the side of the paper material opposite the microporous foam layer whereby condensate within the package may evaporate out through the laminated sheet material.

2. A laminated sheet material as set forth in claim 1, wherein the layer of paper material is reinforced.

3. A laminated sheet material as set forth in claim 2, wherein the layer of paper material is reinforced by fiberglass strands.

4. A laminated sheet material as set forth in claim 3, wherein the layer of paper material comprises two plies of paper between which are interspersed strands of fiberglass.

5. A laminated sheet material as set forth in any one of claims 1, 2, 3, or 4, wherein the layer of polymer comprises polyethylene.

6. A laminated sheet material as set forth in claim 5, wherein the microporous foam polymer comprises a polypropylene microporous foam polymer.

7. A laminated sheet material as set forth in claim 5, wherein the paper material comprises two plies of fifty pound kraft paper each.

8. A laminated sheet material as set forth in claim 7, wherein the microporous foam layer ranges approximately from 1/16 inch to ⅛ inch thick.

9. A laminated sheet material as set forth in claim 1, wherein the polymer layer is adhered to the layer of paper material.

10. A laminated sheet material as set forth in claim 9, wherein it is adhered by a hot melt adhesive.

11. A laminated sheet material as set forth in claim 1, wherein the microporous foam layer has an exposed surface, a cohesive nonadhesive coating is applied to the exposed surface of the mircoporous foam polymer whereby uniquely high coefficient of friction is imparted to the exposed surface, and securing of the laminate to itself is facilitated.

* * * * *